United States Patent
Kobayashi (10) Patent No.: US 8,155,179 B2
(45) Date of Patent: Apr. 10, 2012

(54) ADAPTIVE CABLE EQUALIZER

(75) Inventor: Hitoshi Kobayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 1168 days.

(21) Appl. No.: 11/946,381

(22) Filed: Nov. 28, 2007

(65) Prior Publication Data

US 2008/0123729 A1 May 29, 2008

(30) Foreign Application Priority Data

Nov. 28, 2006 (JP) ................................. 2006-320282

(51) Int. Cl.
*H03H 7/30* (2006.01)

(52) U.S. Cl. ........ 375/232; 375/229; 375/230; 375/231; 375/316; 375/317; 333/18; 333/171; 333/174

(58) Field of Classification Search .......... 375/316–317, 375/324, 330, 340, 346, 229–236; 333/18, 333/171, 174
See application file for complete search history.

(56) References Cited

U.S. PATENT DOCUMENTS

| | | | |
|---|---|---|---|
| 4,894,620 A * | 1/1990 | Nagaraj | 327/91 |
| 6,307,906 B1 * | 10/2001 | Tanji et al. | 375/376 |
| 6,584,151 B1 | 6/2003 | Dehghan et al. | |
| 6,621,335 B2 * | 9/2003 | Andersson | 330/10 |
| 6,819,166 B1 | 11/2004 | Choi et al. | |
| 7,471,016 B2 * | 12/2008 | Stoicescu et al. | 307/150 |
| 7,502,411 B2 * | 3/2009 | Kim et al. | 375/229 |
| 7,526,043 B2 * | 4/2009 | Lim et al. | 375/285 |
| 2006/0165195 A1* | 7/2006 | Dally et al. | 375/316 |

OTHER PUBLICATIONS

A. Baker, "An Adaptive Cable Equalizer for Serial Digital Video Rates to 400Mb/s", ISSCC, 1996, Session 10, Paper FA 10.7, pp. 174-175, 439.

* cited by examiner

*Primary Examiner* — Chieh M Fan
*Assistant Examiner* — Sophia Vlahos
(74) *Attorney, Agent, or Firm* — Hamre, Schumann, Mueller & Larson, P.C.

(57) ABSTRACT

An adaptive cable equalizer includes a data signal input unit, a clock signal input unit, a variable equalizer that inputs a data signal input from the data signal input unit, and a transition time measuring portion that measures a transition time of a data signal output from the variable equalizer, with an equalizer control loop being configured that controls characteristics of the variable equalizer based on the output signal of the transition time measuring portion. The adaptive cable equalizer further includes a control circuit that controls response characteristics of the control loop according to the frequency of a clock signal input from the clock signal input unit. This enables a quick response at fast transfer rates by making the relationship between the response time of the control loop and the number of data bits substantially constant even when the transfer rate changes from a slow transfer rate to a fast transfer rate.

20 Claims, 11 Drawing Sheets

ADAPTIVE CABLE EQUALIZER

BACKGROUND OF THE INVENTION

1. Field of the Invention

The present invention relates to a cable equalizer used in receivers for digital baseband transmission communication and the like, and more particularly to an adaptive cable equalizer suitable for the High-Definition Multimedia Interface (HDMI).

2. Description of Related Art

In recent years, HDMI for connecting digital televisions, digital versatile disk (DVD) devices and the like with high-speed digital baseband communications has become widely used. HDMI refers to communication using Transition Minimized Differential Signaling (TMDS), which is a method of digital baseband transmission in differential current mode. Communication mainly is performed using three TMDS data lines and one TMDS clock line, enabling communication at data transfer rates of approximately 200 Mbps to 3 Gbps.

The transmitting side (source device) of HDMI converts parallel data to serial data using a serializer, based on parallel data and a clock synchronized with the parallel data, and simultaneously sends the serial data to a TMDS data line and the clock to a TMDS clock line. The transfer rate of the clock is standardized to 1/10th of the serial data. The receiving side (sink device) of HDMI converts TMDS data to parallel data using a deserializer that performs clock data recovery (CDR) based on the TMDS clock, and demodulates the data.

Heretofore, the HDMI standards (v1.2) supported communication of 24-bit pixel data at data transfer rates up to 1.5 Gbps, although a standard (v1.3) was formulated in 2006 enabling communication of maximum 48-bit pixel data at 3 Gbps.

Cable equalizers that enable the amount of equalization to be varied are provided on the receiving side following the increases in data transfer rates described above, and technology has been proposed to increase the communicable cable length to approximately 30 meters by employing adaptive cable equalizers that automatically adjust the equalization amount of the equalizer according to the reception state.

Hereinafter, adaptive cable equalizer technologies disclosed in the specifications of U.S. Pat. Nos. 6,819,166 and 6,584,151 and in "An Adaptive Cable Equalizer for Serial Digital Video Rates to 400 Mb/s" (ISSCC 1996, Session 10, Paper FA 10.7) will be described. It is well known that with digital database transmission, the attenuation characteristics of a cable deteriorate relative to a frequency as the cable length increases. Not only does the amplitude of data transmitted from the transmitting side decrease, but there is an increase in the transition time of data from high to low or from low to high. A drop in the slew rate at which data changes leads to an increase in data jitter when separating data with CDR, and a rapid deterioration in the bit error rate (BER).

Generally, the transition time characteristics of data signals are evaluated using an eye pattern, with the eye opening collapsing as cable length increases. In view of this, with the technologies disclosed in the above documents, an adaptive cable equalizer such as shown in FIG. 9 is installed on the receiving side, the equalization amount of the variable equalizer is controlled by measuring the transition time of received data from high to low or from low to high, and the eye is controlled to open so that communication quality is ensured.

Figure 9:
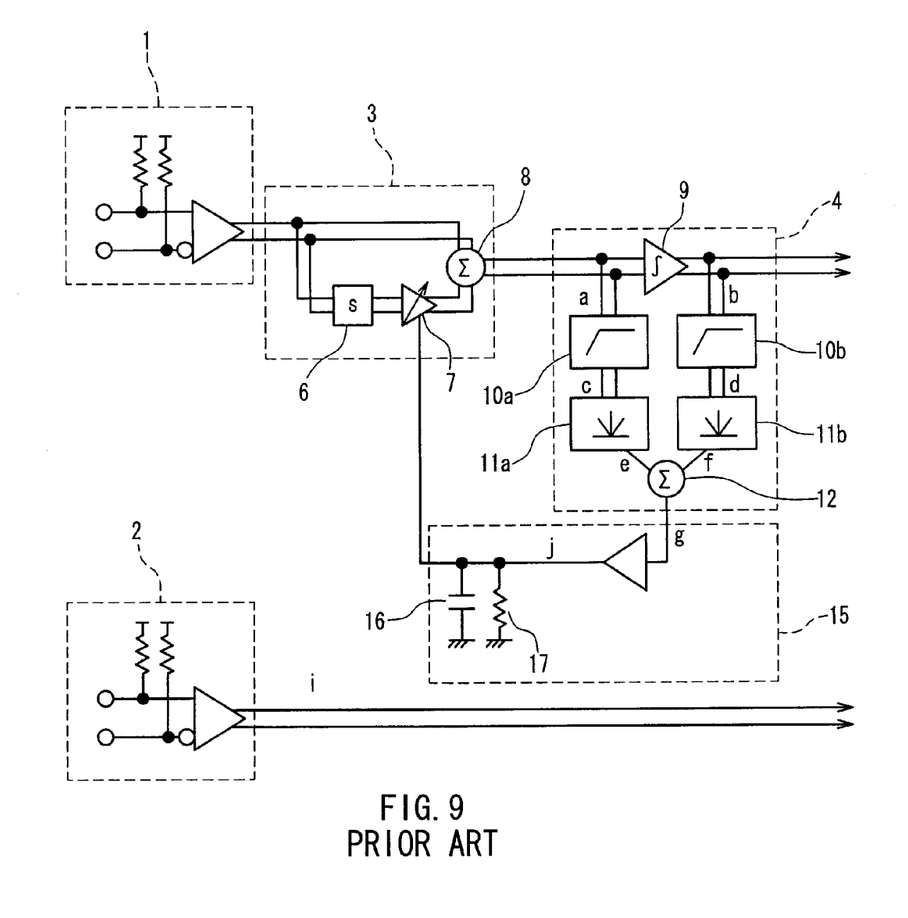
FIG. 9 is a block diagram of a conventional adaptive cable equalizer.

With the adaptive cable equalizer in FIG. 9, reference numeral 1 denotes a data signal input unit, and reference numeral 2 denotes a clock signal input unit. A data signal input from the data signal input unit 1 is input to a variable equalizer 3, and a data signal output from the variable equalizer 3 is input to a transition time measuring portion 4, where the transition time of the data signal is measured. The output signal of the transition time measuring portion 4 is processed by an integrator 15 to obtain a control signal, and a control loop is configured by controlling the variable equalizer 3 using the control signal.

The variable equalizer 3 is constituted by a differentiator 6, a variable gain amplifier 7 and an adder 8. The characteristics of the variable equalizer 3 change as a result of the gain of the variable gain amplifier 7 changing according to the output signal (control signal) of the integrator 15.

The transition time measuring portion 4 is constituted by a quantizer (comparator) 9, differentiators 10a and 10b that are constituted by high-pass filters and the like and to which the input and output signals of the quantizer 9 are input, full-wave rectifiers 11a and 11b that perform full-wave rectification on the differential signals of the differentiators 10a and 10b, and a subtractor 12 to which the output signals of the full-wave rectifiers 11a and 11b are input. The output signal of the subtractor 12 is input to the integrator 15, which is constituted by a low-pass filter that includes a capacitor 16 and a resistor 17. The variable equalizer 3 is controlled using the control signal output from the integrator 15, so that the transition times of the input and output signals of the quantizer 9 are the same.

Figure 10:
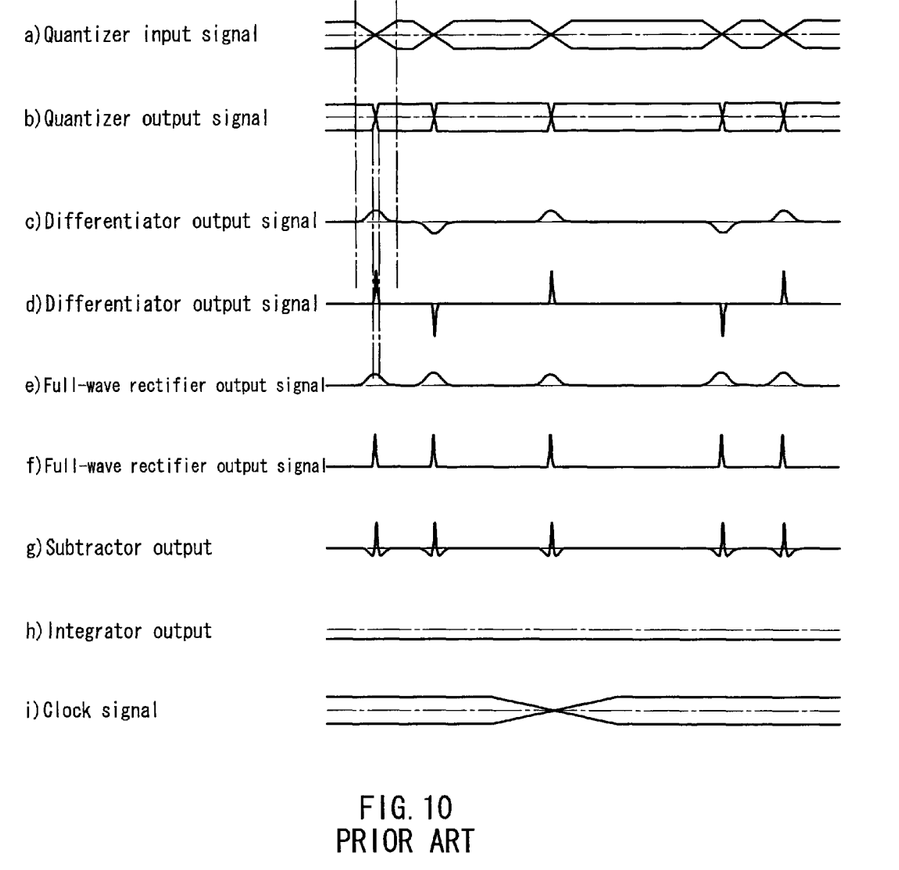
FIG. 10 illustrates the operations of the conventional adaptive cable equalizer.

FIG. 10 shows the signal waveforms of the elements in the adaptive cable equalizer of FIG. 9. (a) and (b) are the input and output signals of the quantizer 9, which are respectively input to the differentiators 10a and 10b. With the output of the differentiators 10a and 10b, the gradients of the transition times from high to low or from low to high are output as the differential signals of the differential waveforms (c) and (d). Full-wave rectification is performed on the differential waveforms (c) and (d) by the full-wave rectifiers 11a and 11b to obtain the signals (e) and (f). The subtractor 12 inputs the signal (g) obtained by subtracting the full-wave rectified signals (e) and (f) to the integrator 15. The integrator output (h) output from the integrator 15 is input to the variable equalizer 3 as a control signal, and control is performed so that the transition times of the input and output signals of the quantizer 9 are the same. (i) indicates the clock signal.

The technology disclosed in the above documents enables communication quality to be ensured using this method, even when cable length increases.

However, with conventional adaptive cable equalizers, the response time of the control loop is decided primarily by the time constant of the integrator 15, and moreover the response time of the control loop is fixed. Therefore, there is not a constant relationship between the time needed for the control loop to stabilize and the data bit number of transferred data.

Because HDMI data bit strings are modulated for CDR so as to contain no consecutive 0's or 1's, the distribution of data frequency components has an approximately 20-fold frequency distribution, from 1010 to 100 . . . 01. Further, the data transfer rate needs to be variable from approximately 200 Mbps to 3 Gbps to match the display format.

Figure 11A:
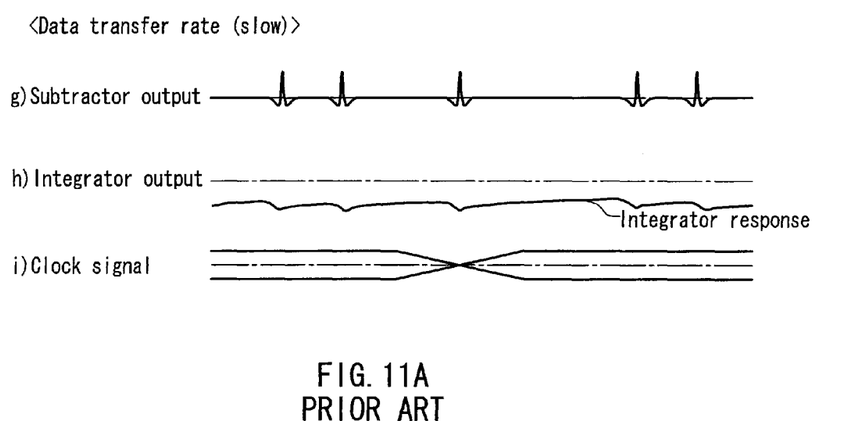
FIGS. 11A and 11B illustrate the association between the integrator output and the transfer data rate of the conventional adaptive cable equalizer.
Figure 11B:
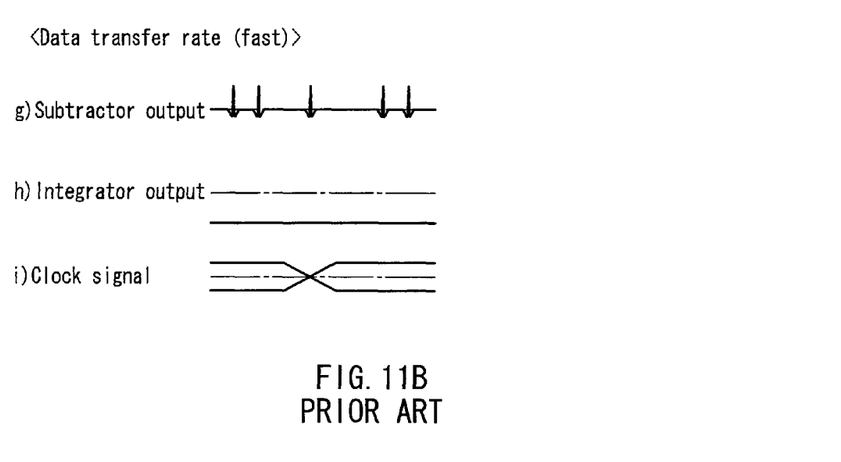

Consequently, in the case of the time constant of the integrator 15 being fixed, settings such as shown in FIGS. 11A and 11B are required. The waveforms (g), (h) and (i) shown in FIGS. 11A and 11B correspond to the waveforms (g), (h) and (i) in FIG. 10. FIG. 11A shows the case of a slow data transfer rate, while FIG. 11B shows the case of a fast data transfer rate. The time constant of the integrator 15 needs to be set sufficiently longer than approximately 1/20th of the minimum transfer rate, so as to enable peak detection of the data transfer rate of the subtractor 12, even at the minimum transfer rate. If the time constant of the integrator 15 is not set sufficiently long, the integrator response will be insufficient, as shown by the integrator output (h) of FIG. 11A.

On the other hand, when the time constant of the integrator 15 is set to meet this condition, the data bit number needed for the control loop response of the adaptive cable equalizer to stabilize at the maximum transfer rate is extremely large. Further, integration into a semiconductor apparatus is also difficult, since the time constant of the integrator 15 often is set using a capacitor, and the capacitance value for obtaining a response time that meets the above condition is extremely large.

SUMMARY OF THE INVENTION

It is an object of the present invention to solve the above problems and to provide an adaptive cable equalizer that enables the response time of the control loop to be changed in accordance with the transfer rate, so as to enable a quick response at fast transfer rates by making the relationship between the response time of the control loop and the number of data bits substantially constant, even when the transfer rate changes from a slow transfer rate to a fast transfer rate.

To solve the above problems, an adaptive cable equalizer having a first configuration of the present invention includes a data signal input unit, a clock signal input unit, a variable equalizer to which a data signal input from the data signal input unit is input, and a transition time measuring portion that measures a transition time of a data signal output from the variable equalizer. A control loop is configured so as to control a characteristic of the variable equalizer based on an output signal of the transition time measuring portion. A control circuit is provided in the control loop so as to control a response characteristic of the control loop according to a frequency of a clock signal input from the clock signal input unit.

An adaptive cable equalizer having a second configuration of the present invention includes first to nth data signal input units to each of which a data signal can be input, with n being an integer, a clock signal input unit, first to nth variable equalizers respectively to which the data signals input from the first to nth data signal input units are input, and a transition time measuring portion that measures a transition time of a data signal output from the first variable equalizer. A control loop is configured so as to control the first to nth variable equalizers based on an output signal of the transition time measuring portion. A control circuit is provided in the control loop so as to control a response characteristic of the control loop according to a frequency of a clock signal input from the clock signal input unit.

An adaptive cable equalizer having a third configuration of the present invention includes first to nth data signal input units to each of which a data signal can be input, with n being an integer, a clock signal input unit, first to nth variable equalizers respectively to which the data signals input from the first to nth data signal input units are input, and first to nth transition time measuring portions that respectively measure a transition time of data signals output from the first to nth variable equalizers. A control loop is configured so as to control simultaneously the first to nth variable equalizers based on a control signal generated from output signals of the first to nth transition time measuring portions. A control circuit is provided in the control loop so as to control a response characteristic of the control loop according to a frequency of a clock signal input from the clock signal input unit.

DETAILED DESCRIPTION OF THE INVENTION

According to adaptive cable equalizers of the present invention having the foregoing configurations, the relationship between the response time of the control loop and the number of data bits can be made substantially constant even when the transfer rate changes from a slow transfer rate to a fast transfer rate, by enabling the response time of the control loop to be controlled according to a clock signal that forms the basis of data signals.

The present invention is able to adopt modes such as the following, based on the foregoing configurations.

In an adaptive cable equalizer having any of the above-mentioned configurations of the present invention, the transfer function of the control circuit can be controlled by a current source whose output magnitude changes according to a frequency of the clock signal.

Alternatively, the transfer function of the control circuit can be controlled by a voltage source whose output magnitude changes according to a frequency of the clock signal.

Alternatively, the control circuit may include a logic circuit that operates with the clock signal supplied from the clock signal input unit, so that a transfer function of the control circuit changes according to a frequency of the clock signal.

Also, the equalization amount of the variable equalizer can be discretely variable.

The logic circuit can be a digital filter.

At least one of an analog-to-digital converter and a digital-to-analog converter can be provided in the control loop.

Further, in an adaptive cable equalizer having the third configuration, the control circuit can use one of the average value, the maximum value and the minimum value of the output signals of the first to nth transition time measuring portions as the control signal.

An adaptive cable equalizer in preferred embodiments of the present invention will now be described with reference to the drawings.

(First Embodiment)

Figure 1:
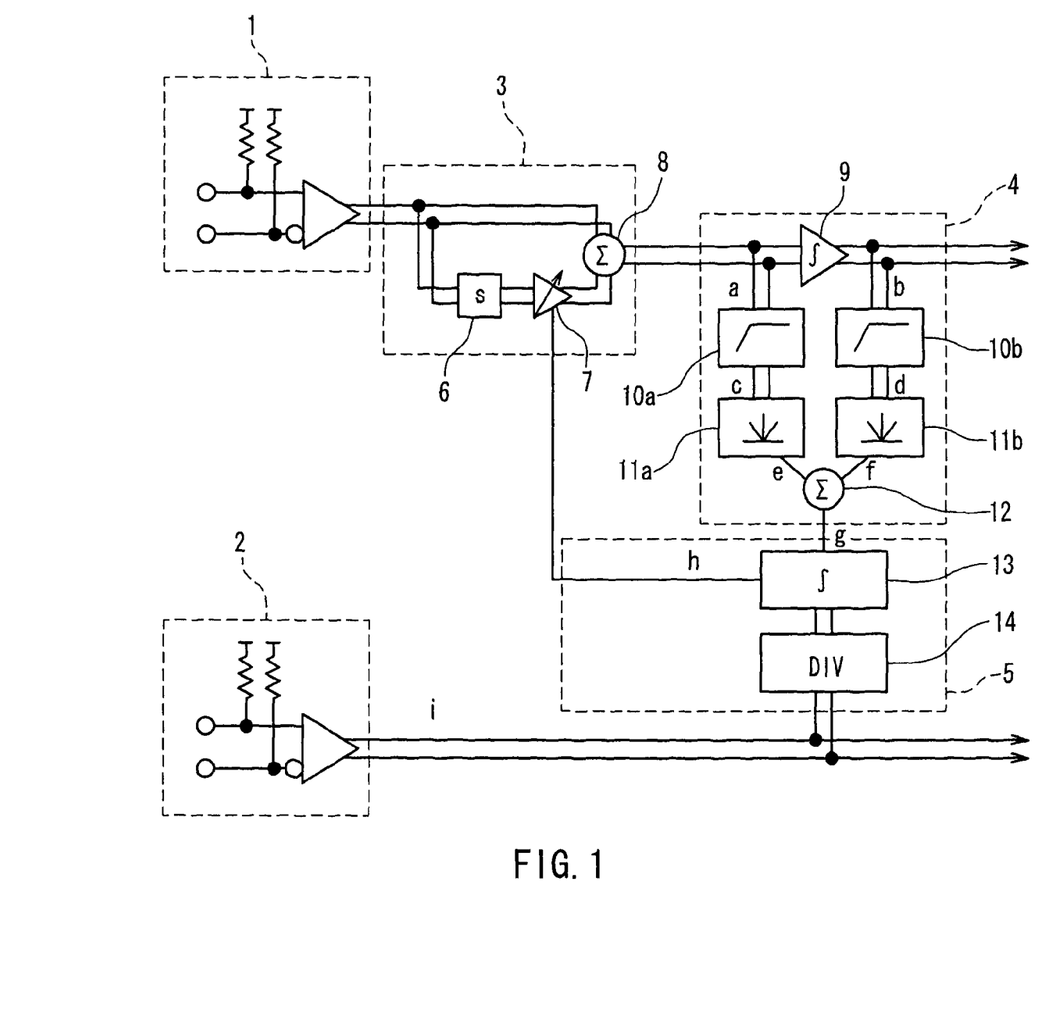
FIG. 1 is a block diagram of an adaptive cable equalizer in a first embodiment of the present invention.

FIG. 1 shows an adaptive cable equalizer in a first embodiment. The same reference numerals are assigned to elements that are the same as the conventional adaptive cable equalizer shown in FIG. 9, and description thereof will not be repeated.

The configuration of the adaptive cable equalizer in the embodiment is basically similar to the prior art shown in FIG. 9. A data signal input from a data signal input unit 1 is input to a variable equalizer 3, and a data signal output from the variable equalizer 3 is input to a transition time measuring portion 4, where the transition time of the data signal is measured. The output signal of the transition time measuring portion 4 is processed by an integrator 13 to obtain a control signal h, and a control loop is configured by controlling the variable equalizer 3 using the control signal h.

In the present embodiment, a response time control circuit 5 replaces the integrator 15 of the adaptive cable equalizer in FIG. 9. The response time control circuit 5 is constituted by the integrator 13 and a frequency divider 14. The basic functions of the integrator 13 are similar to the integrator 15 in FIG. 9. A clock signal input from a clock signal input unit 2 is input to the integrator 13 after passing through the frequency divider 14. The response time of the integrator 13 changes according to the input clock signal i.

The HDMI standards stipulate that the clock signal i be transmitted at 1/10th the frequency of the data transfer rate. Consequently, even if the data transfer rate varies, the response time of the control loop can be kept constant relative to the data bit number of data signals, by controlling the response time of the integrator 13 according to the frequency of the clock signal i.

Figure 2A:
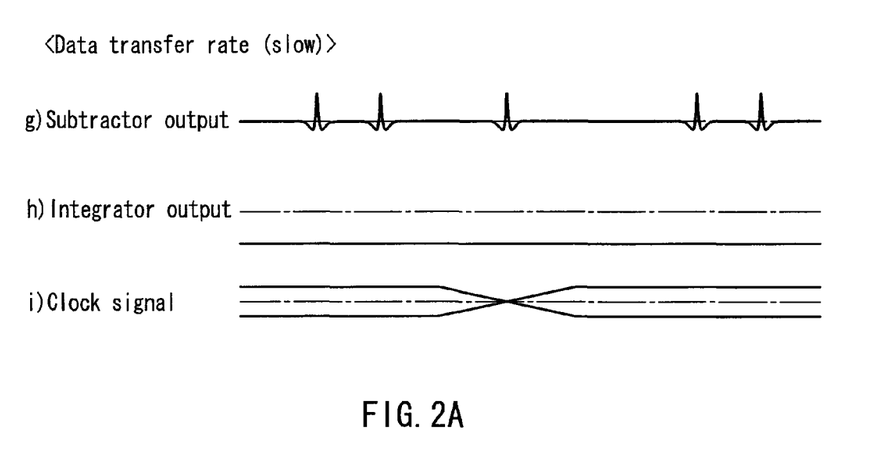
FIGS. 2A and 2B illustrate the association between the integrator output and the transfer data rate of the adaptive cable equalizer.
Figure 2B:
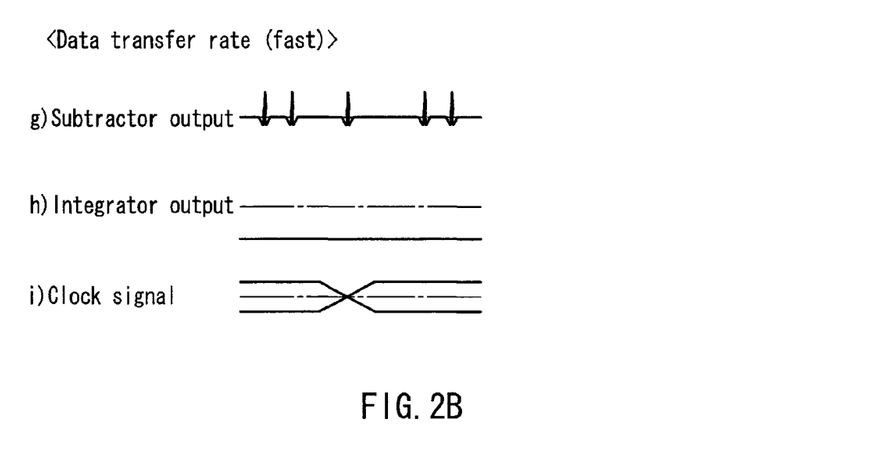
Figure 3:
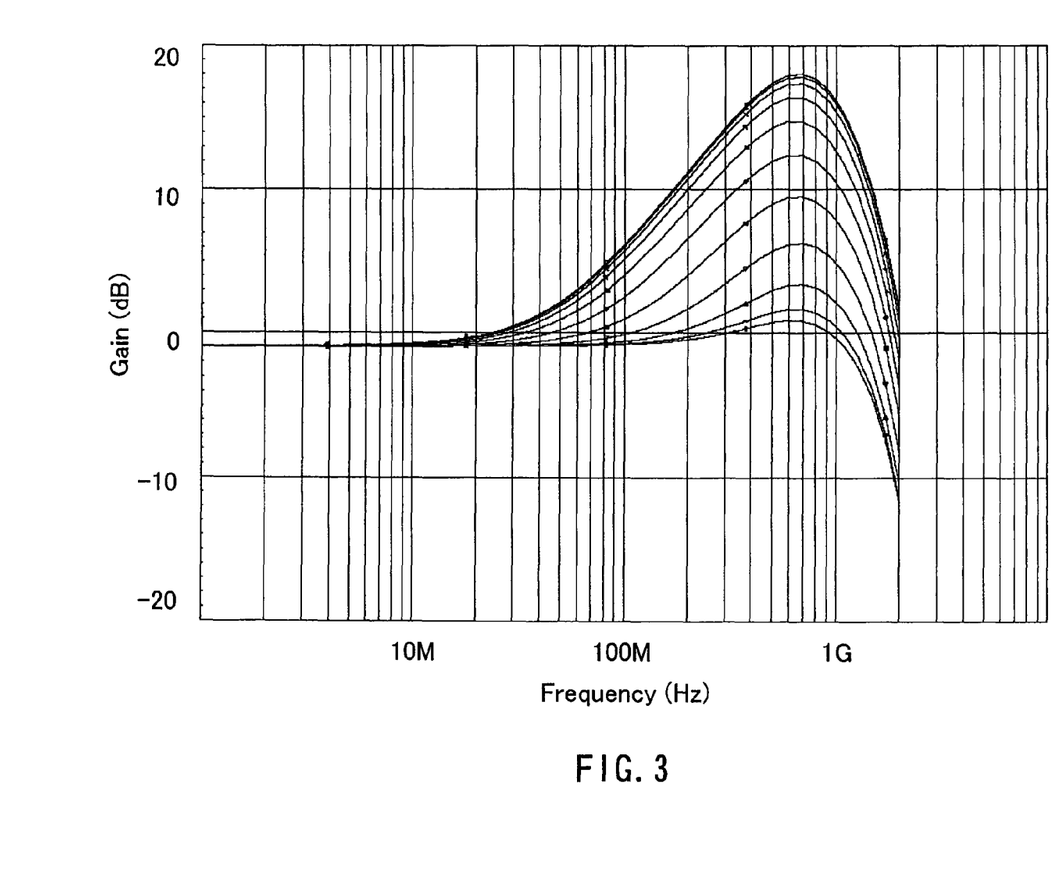
FIG. 3 shows exemplary characteristics of a variable equalizer in the adaptive cable equalizer.

The integrator output operation in the response time control circuit 5 of the adaptive cable equalizer of the present embodiment in the case where the data transfer rate varies will be described with reference to FIGS. 2A and 2B. The waveforms (g), (h) and (i) shown in FIGS. 2A and 2B correspond to the waveforms (g), (h) and (i) in FIG. 10. The adaptive cable equalizer of the present embodiment enables the response time of the integrator to be kept constant relative to the bit number of data signals as shown in FIGS. 2A and 2B, since the response time changes in accordance with changes in the data transfer rate. FIG. 3 shows exemplary characteristics of the variable equalizer 3 in the adaptive cable equalizer of the present embodiment.

The waveforms in FIG. 3 show an example in which the frequency-gain characteristics of the variable equalizer 3 change when the control signal h for controlling the variable equalizer 3 in FIG. 1 is changed. The frequency characteristics of the cable forming the signal transmission line are such that attenuation increases with higher frequency, and the attenuation of high frequency components generally increases with length of the cable. A cable equalizer is a device that corrects degradation of high frequency components due to the cable by increasing the gain (amplification factor) of the high frequency components over the low frequency components of input signals contrary to the frequency characteristics of the cable, and makes waveforms of received signals equal to those transmitted from the transmitting side. The variable equalizer 3 of FIG. 1 used in the present embodiment is able to adjust the gain of high frequency components using the control signal, according to the amount of degradation of the high frequency components due to cable length, and is constituted by a differentiator 6, a variable gain amplifier 7 controlled by the control signal h, and an adder 8. If the amplification factor of the variable gain amplifier 7 is assumed to be A, the transfer function thereof will be $(1+A \times S)$, enabling a variable equalizer having the frequency characteristics of FIG. 3 to be realized.

Figure 4:
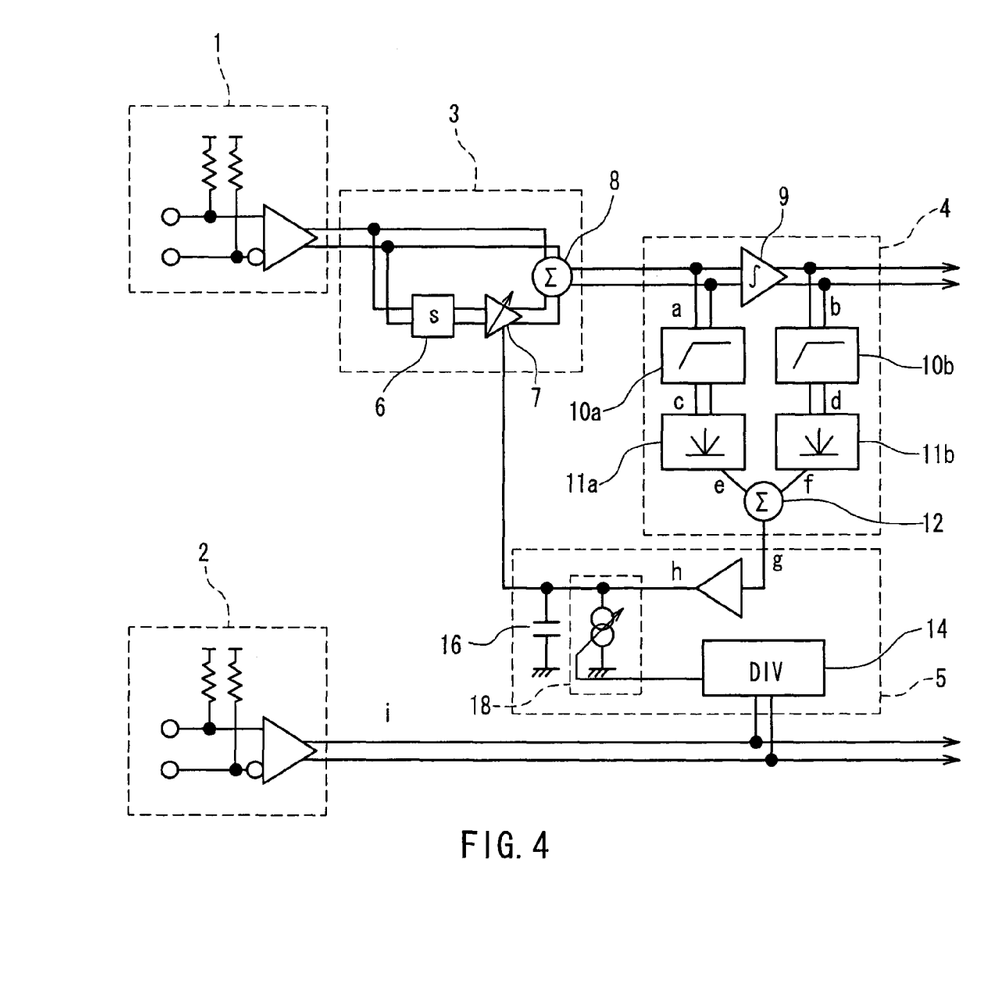
FIG. 4 is a block diagram showing a specific exemplary configuration of the adaptive cable equalizer.

FIG. 4 shows a specific exemplary configuration of the response time control circuit 5. With the configuration in FIG. 4, the response time control circuit 5 has a frequency-current conversion circuit 18. The transfer function of the response time control circuit 5 is controlled using a current generated by the frequency-current conversion circuit 18 according to the clock frequency supplied from the frequency divider 14, enabling the response time to be controlled according to the clock frequency.

Figure 5:
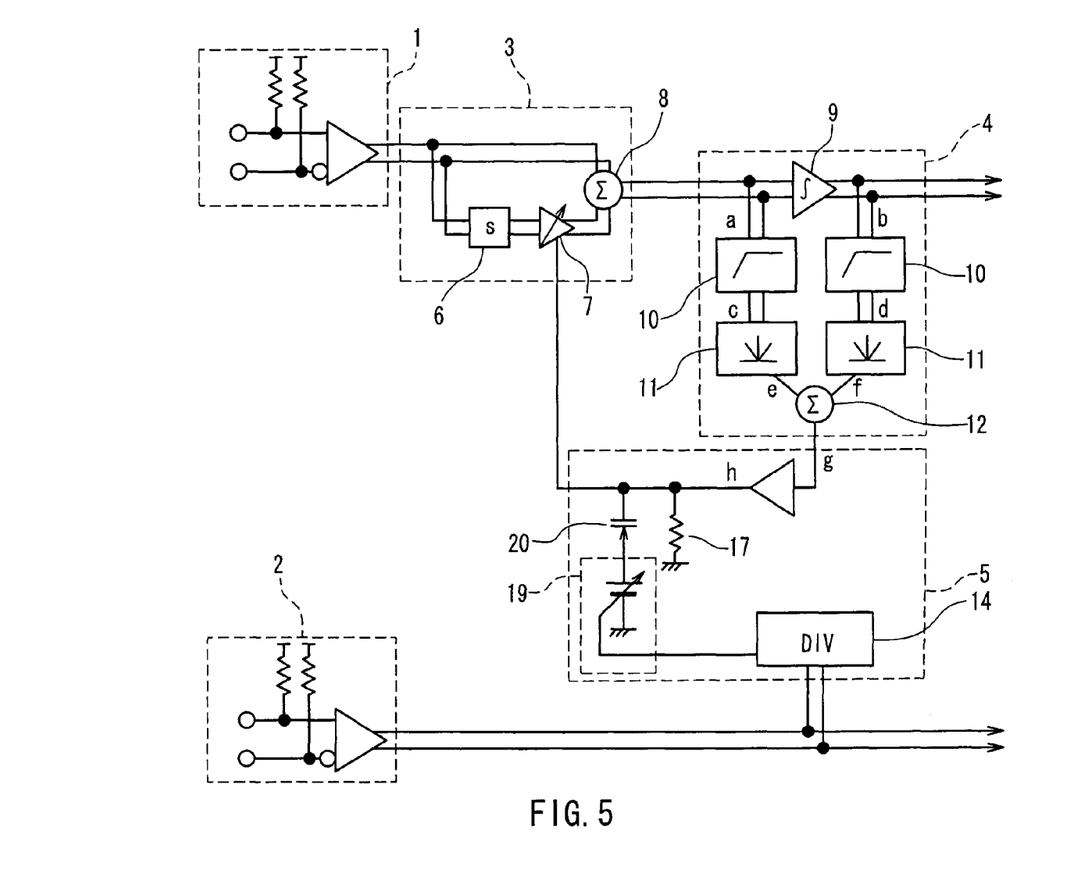
FIG. 5 is a block diagram showing another specific exemplary configuration of the adaptive cable equalizer.

FIG. 5 shows another specific exemplary configuration of the response time control circuit 5. With the configuration in FIG. 5, the response time control circuit 5 has a frequency-voltage conversion circuit 19 and a voltage controlled variable capacitor 20, which are combined with the resistor 17 so as to compose the low pass filter. The transfer function of the response time control circuit 5 is controlled by applying a voltage generated by the frequency-voltage conversion circuit 19 according to the clock frequency supplied from the frequency divider 14 to the voltage controlled variable capacitor 20, enabling the response time to be controlled according to the clock frequency.

Figure 6:
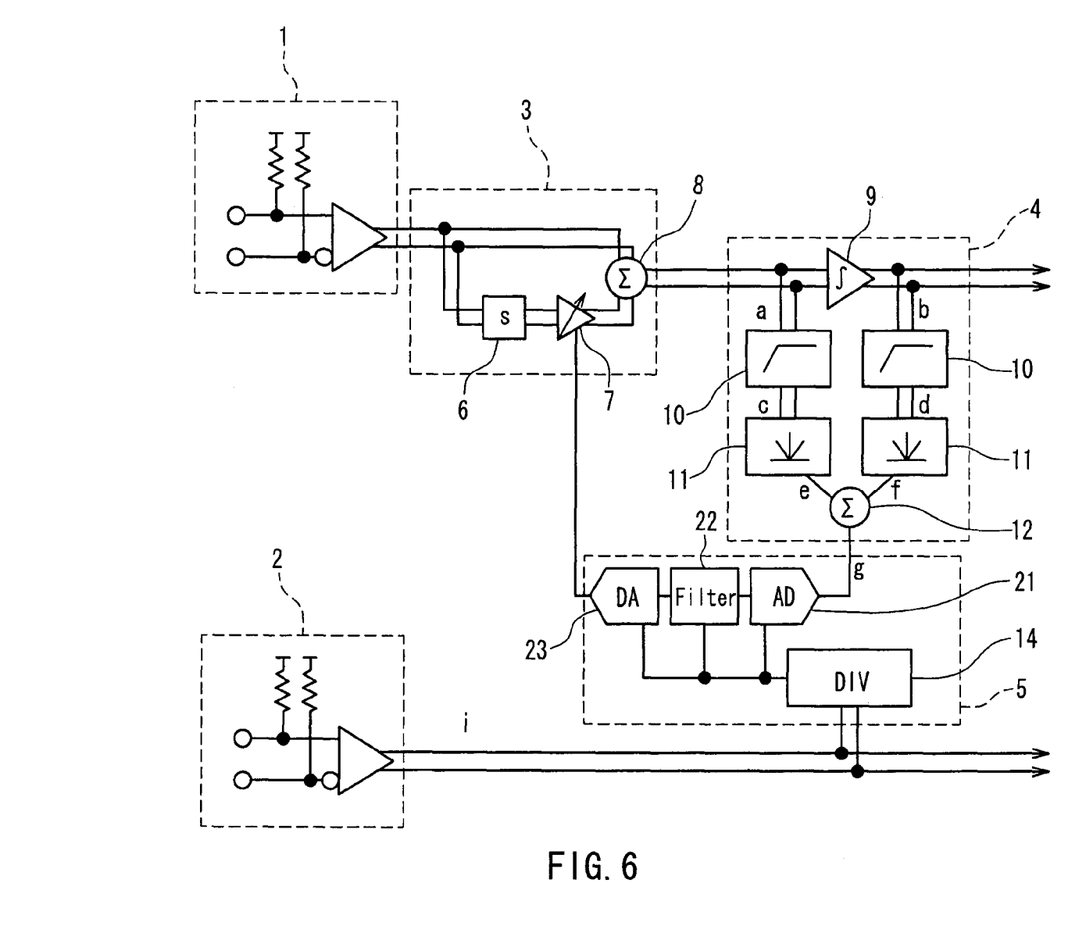
FIG. 6 is a block diagram showing yet another specific exemplary configuration of the adaptive cable equalizer.

FIG. 6 shows yet another specific exemplary configuration of the response time control circuit 5. With the configuration in FIG. 6, the response time control circuit 5 has an analog-to-digital (A/D) conversion circuit 21, a digital filter 22 and a digital-to-analog (D/A) conversion circuit 23 in order to constitute an integrator. A logic circuit such as digital filter 22 operates based on the clock signal i. Consequently, the response time of the response time control circuit 5 is linked to the clock signal frequency, enabling the response time to be controlled.

The configuration in FIG. 6 also facilitates integration of the entire circuitry into a semiconductor apparatus, since a capacitor for setting the response time of the response time control circuit 5 is not required, and the response time control circuit 5 is constituted by digital circuitry.

Note that with the adaptive cable equalizer of the present embodiment, the variable equalizer 3 can be constituted so that the amount of equalization is discretely variable.

(Second Embodiment)

Figure 7:
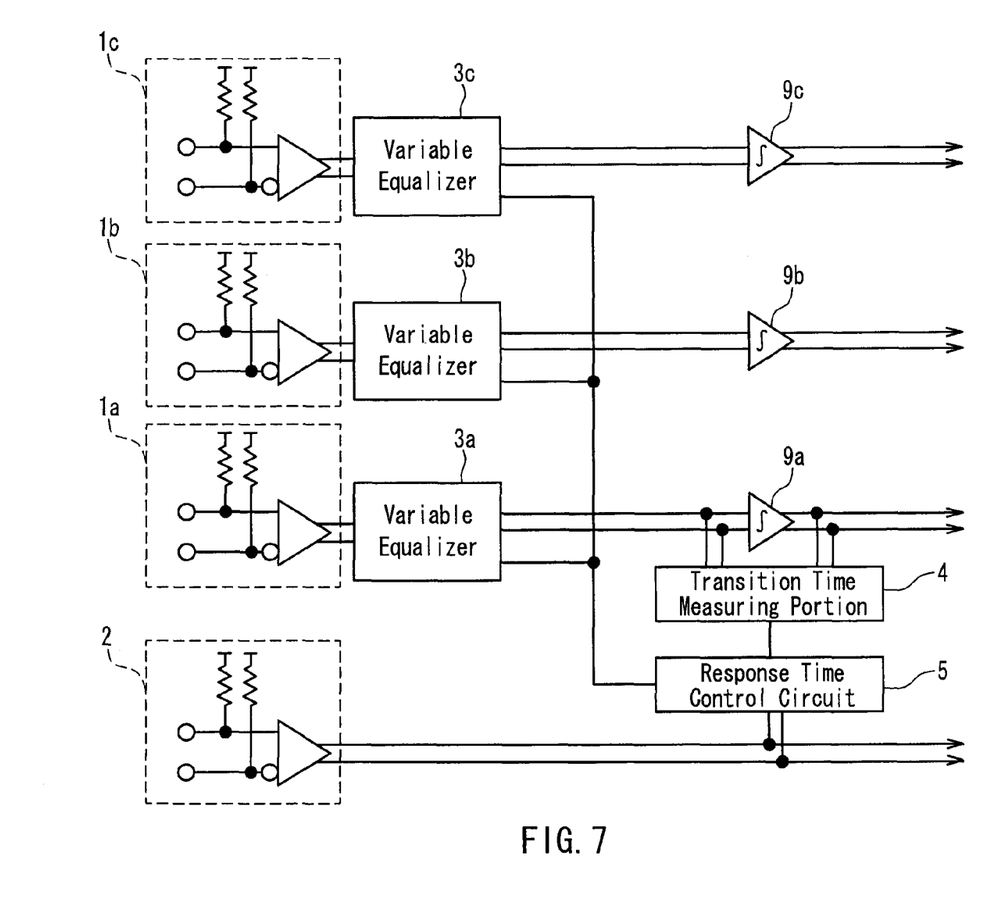
FIG. 7 is a block diagram of an adaptive cable equalizer in a second embodiment of the present invention.

FIG. 7 shows a block diagram of an adaptive cable equalizer in a second embodiment. The adaptive cable equalizer of the present embodiment has a plurality (three in FIG. 7) of serial data signal input units 1a to 1c, with variable equalizers 3a to 3c and quantizers 9a to 9c being installed with respect thereto.

In the present embodiment, a transition time measuring portion 4 only is installed with respect to the serial data signal input from the serial data signal input unit 1a. The output signal of the response time control circuit 5 is supplied so as to control the plurality of the variable equalizers 3a to 3c simultaneously.

With HDMI, cables in which three serial data signals are bundled with a single clock signal mainly are used. The cable characteristics of the three data signals are substantially matched. Consequently, satisfactory practical performance can be obtained by applying the amount of equalization set using the control loop of a single data signal to the other signals.

(Third Embodiment)

Figure 8:
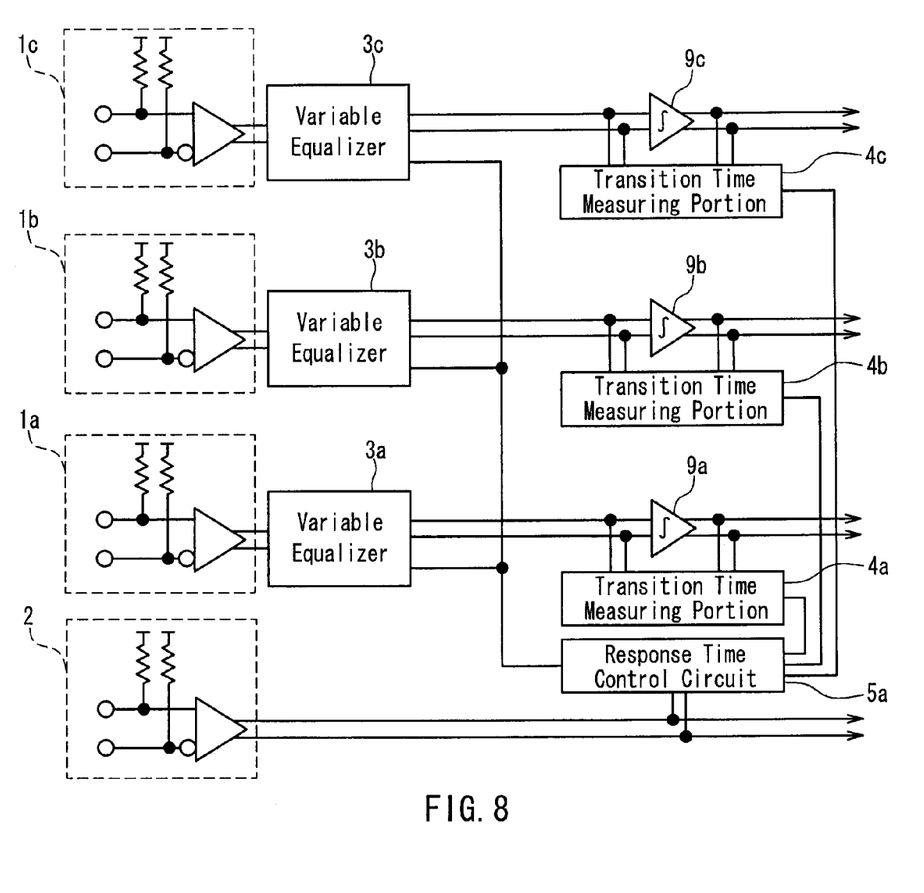
FIG. 8 is a block diagram of an adaptive cable equalizer in a third embodiment of the present invention.

FIG. 8 shows a block diagram of an adaptive cable equalizer in a third embodiment. The same reference numerals are attached to elements that are the same as the adaptive cable equalizer of the second embodiment in FIG. 7, and description thereof will not be repeated.

With the adaptive cable equalizer of the present embodiment, transition time measuring portions 4a to 4c are installed with respect to all of the plurality of the serial data signal input units 1a to 1c. The measurement results of the transition time measuring portions 4a to 4c are input to a single response time control circuit 5a. The response time control circuit 5a sets the response time of the control loop and simultaneously controls the plurality of variable equalizers 3a to 3c using the clock signal and the average value of the measurement values of the plurality of transition time measuring portions 4a to 4c. Instead of the average value of the measurement values, maximum or minimum value may be used.

With an HDMI cable in which three data signals are bundled with a single clock signal, the communication states of the three signals are thought to be substantially matched, although there is considered to be a certain degree of variability. With the adaptive cable equalizer of the present embodiment, this variability is absorbed by the response time control circuit 5a, making it possible to ensure the excellent communication quality of the three data signals.

The adaptive cable equalizer of the present invention as described above enables a quick response at fast transfer rates, by keeping the relationship between the response time of the control loop and the number of data bits substantially constant, even when the data transfer rate changes from a slow transfer rate to a fast transfer rate. This adaptive cable equalizer is useful because it improves the communication quality of digital baseband transfer systems such as HDMI in which the reference clock and data signals are transmitted simultaneously, and enables data transfer with longer cables.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An adaptive cable equalizer comprising:
   a data signal input unit;
   a clock signal input unit;
   a variable equalizer to which a data signal input from the data signal input unit is input; and
   a transition time measuring portion that measures a transition time of a data signal output from the variable equalizer,
   a control loop configured to control a characteristic of the variable equalizer based on an output signal of the transition time measuring portion,
   wherein a control circuit is provided in the control loop so as to control a response characteristic of the control loop according to a frequency of a clock signal input from the clock signal input unit, and
   a transfer function of the control circuit is controlled by a current source whose output magnitude changes according to a frequency of the clock signal.

2. The adaptive cable equalizer according to claim 1, further comprising at least one of an analog-to-digital converter and a digital-to-analog converter in the control loop,
   wherein an equalization amount of the variable equalizer is discretely variable.

3. An adaptive cable equalizer comprising:
   a data signal input unit;
   a clock signal input unit;
   a variable equalizer to which a data signal input from the data signal input unit is input; and
   a transition time measuring portion that measures a transition time of a data signal output from the variable equalizer,
   a control loop configured to control a characteristic of the variable equalizer based on an output signal of the transition time measuring portion,
   wherein a control circuit is provided in the control loop so as to control a response characteristic of the control loop according to a frequency of a clock signal input from the clock signal input unit, and
   a transfer function of the control circuit is controlled by a voltage source whose output magnitude changes according to a frequency of the clock signal.

4. The adaptive cable equalizer according to claim 3, further comprising at least one of an analog-to-digital converter and a digital-to-analog converter in the control loop,
   wherein an equalization amount of the variable equalizer is discretely variable.

5. An adaptive cable equalizer comprising:
   a data signal input unit;
   a clock signal input unit;
   a variable equalizer to which a data signal input from the data signal input unit is input; and
   a transition time measuring portion that measures a transition time of a data signal output from the variable equalizer,
   a control loop configured to control a characteristic of the variable equalizer based on an output signal of the transition time measuring portion,
   wherein a control circuit is provided in the control loop so as to control a response characteristic of the control loop according to a frequency of a clock signal input from the clock signal input unit, and
   the control circuit comprises a digital filter that operates with the clock signal supplied from the clock signal input unit, so that a transfer function of the control circuit changes according to a frequency of the clock signal.

6. The adaptive cable equalizer according to claim 5, further comprising at least one of an analog-to-digital converter and a digital-to-analog converter in the control loop.

7. An adaptive cable equalizer comprising:
   first to nth data signal input units to each of which a data signal can be input, with n being an integer;
   a clock signal input unit;
   first to nth variable equalizers respectively to which the data signals input from the first to nth data signal input units are input; and
   a transition time measuring portion that measures a transition time of a data signal output from the first variable equalizer,
   a control loop configured to control the first to nth variable equalizers based on an output signal of the transition time measuring portion,
   wherein a control circuit is provided in the control loop so as to control a response characteristic of the control loop according to a frequency of a clock signal input from the clock signal input unit, and
   a transfer function of the control circuit is controlled by a current source whose output magnitude changes according to a frequency of the clock signal.

8. An adaptive cable equalizer comprising:
   first to nth data signal input units to each of which a data signal can be input, with n being an integer;
   a clock signal input;
   first to nth variable equalizers respectively to which the data signals input from the first to nth data signal input units are input; and
   a transition time measuring portion that measures a transition time of a data signal output from the first variable equalizer,
   a control loop configured to control the first to nth variable equalizers based on an output signal of the transition time measuring portion, wherein a control circuit is provided in the control loop so as to control a response characteristic of the control loop according to a frequency of a clock signal input from the clock signal input unit, and a transfer function of the control circuit is controlled by a voltage source whose output magnitude changes according to a frequency of the clock signal.

9. The adaptive cable equalizer according to claim 8, further comprising at least one of an analog-to-digital converter and a digital-to-analog converter in the control loop,
wherein an equalization amount of the variable equalizer is discretely variable.

10. An adaptive cable equalizer comprising:
first to nth data signal input units to each of which a data signal can be input, with n being an integer;
a clock signal input unit;
first to nth variable equalizers respectively to which the data signals input from the first to nth data signal input units are input; and
a transition time measuring portion that measures a transition time of a data signal output from the first variable equalizer,
a control loop configured to control the first to nth variable equalizers based on an output signal of the transition time measuring portion,
wherein a control circuit is provided in the control loop so as to control a response characteristic of the control loop according to a frequency of a clock signal input from the clock signal input unit, and
the control circuit comprises a digital filter that operates with the clock signal supplied from the clock signal input unit, so that a transfer function of the control circuit changes according to a frequency of the clock signal.

11. The adaptive cable equalizer according to claim 10, further comprising at least one of an analog-to-digital converter and a digital-to-analog converter in the control loop.

12. The adaptive cable equalizer according to claim 10, further comprising at least one of an analog-to-digital converter and a digital-to-analog converter in the control loop,
wherein an equalization amount of the variable equalizer is discretely variable.

13. The An adaptive cable equalizer comprising:
first to nth data signal input units to each of which a data signal can be input, with n being an integer;
a clock signal input unit;
first to nth variable equalizers respectively to which the data signals input from the first to nth data signal input units are input; and
first to nth transition time measuring portions that respectively measure a transition time of data signals output from the first to nth variable equalizers,
a control loop configured to simultaneously control the first to nth variable equalizers based on a control signal generated from output signals of the first to nth transition time measuring portions,
wherein a control circuit is provided in the control loop so as to control a response characteristic of the control loop according to a frequency of a clock signal input from the clock signal input unit, and
a transfer function of the control circuit is controlled by a current source whose output magnitude changes according to a frequency of the clock signal.

14. The adaptive cable equalizer according to claim 13, further comprising at least one of an analog-to-digital converter and a digital-to-analog converter in the control loop,
wherein an equalization amount of the variable equalizer is discretely variable.

15. The adaptive cable equalizer according to claim 13, wherein the control circuit uses one of an average value, a maximum value and a minimum value of the output signals of the first to nth transition time measuring portions as the control signal.

16. An adaptive cable equalizer comprising:
first to nth data signal input units to each of which a data signal can be input, with n being an integer;
a clock signal input unit;
first to nth variable equalizers respectively to which the data signals input from the first to nth data signal input units are input; and
first to nth transition time measuring portions that respectively measure a transition time of data signals output from the first to nth variable equalizers,
a control loop configured to simultaneously control the first to nth variable equalizers based on a control signal generated from output signals of the first to nth transition time measuring portions,
wherein a control circuit is provided in the control loop so as to control a response characteristic of the control loop according to a frequency of a clock signal input from the clock signal input unit, and
a transfer function of the control circuit is controlled by a voltage source whose output magnitude changes according to a frequency of the clock signal.

17. The adaptive cable equalizer according to claim 16, further comprising at least one of an analog-to-digital converter and a digital-to-analog converter in the control loop,
wherein an equalization amount of the variable equalizer is discretely variable.

18. The adaptive cable equalizer according to claim 16, wherein the control circuit uses one of an average value, a maximum value and a minimum value of the output signals of the first to nth transition time measuring portions as the control signal.

19. An adaptive cable equalizer comprising:
first to nth data signal input units to each of which a data signal can be input, with n being an integer;
a clock signal input unit;
first to nth variable equalizers respectively to which the data signals input from the first to nth data signal input units are input; and
first to nth transition time measuring portions that respectively measure a transition time of data signals output from the first to nth variable equalizers,
a control loop configured to simultaneously control the first to nth variable equalizers based on a control signal generated from output signals of the first to nth transition time measuring portions,
wherein a control circuit is provided in the control loop so as to control a response characteristic of the control loop according to a frequency of a clock signal input from the clock signal input unit, and
the control circuit comprises a digital filter that operates with the clock signal supplied from the clock signal input unit, so that a transfer function of the control circuit changes according to a frequency of the clock signal.

20. The adaptive cable equalizer according to claim 19, further comprising at least one of an analog-to-digital converter and a digital-to-analog converter in the control loop.

* * * * *